United States Patent [19]

Broich et al.

[11] Patent Number: 5,455,066
[45] Date of Patent: Oct. 3, 1995

[54] WATER-CONTAINING ADHESIVE BASED ON CASEIN

[75] Inventors: Ludwig Broich, Duesseldorf; Bernhard Herlfterkamp, Bottrop; Hermann Onusseit, Haan, all of Germany

[73] Assignee: Henkel Kommanditogesellschaft auf Aktien, Duesseldorf, Germany

[21] Appl. No.: 190,134

[22] PCT Filed: Jul. 29, 1992

[86] PCT No.: PCT/EP92/01722

§ 371 Date: Feb. 3, 1994

§ 102(e) Date: Feb. 3, 1994

[87] PCT Pub. No.: WO93/03110

PCT Pub. Date: Feb. 18, 1993

[30] Foreign Application Priority Data

Aug. 7, 1991 [DE] Germany ............... 41 26 075.9

[51] Int. Cl.$^6$ ............... B05D 5/10; C08H 1/04; C08L 89/00; C09D 101/00
[52] U.S. Cl. ............... 427/208.2; 427/364; 427/299; 427/414; 106/139; 106/144; 106/213
[58] Field of Search ............... 427/414, 364, 427/208.2, 299, 208.8; 106/139, 144, 213

[56] References Cited

U.S. PATENT DOCUMENTS

| | | | |
|---|---|---|---|
| 2,003,065 | 5/1935 | Boyce | 427/414 |
| 2,357,073 | 8/1944 | Billing | 106/144 |
| 2,943,071 | 6/1960 | Laden | 260/27 |
| 3,157,533 | 11/1964 | Clancy et al. | 106/139 |
| 3,692,713 | 9/1972 | Columbus et al. | 260/17.4 |
| 3,836,386 | 9/1974 | Roy | 427/389.3 |
| 3,857,803 | 12/1974 | Shenfeld et al. | 106/213 |
| 4,262,058 | 4/1981 | Saunders | 427/409 |
| 4,464,202 | 8/1984 | Andres et al. | 106/139 |
| 4,964,939 | 10/1990 | Gleason | 106/212 |

FOREIGN PATENT DOCUMENTS 0080141  6/1983  European Pat. Off. .
1620092  4/1970  Germany .

OTHER PUBLICATIONS

Chemical Abstracts, vol. 89, No. 10, Oct. 1, 1978, Columbus, Ohio, US; Abstract No. 148480q, "Thermosetting Adhesive Composition" p. 90.

Primary Examiner—Diana Dudash
Attorney, Agent, or Firm—Wayne C. Jaeschke; John Daniel Wood; Daniel S. Ortiz

[57] ABSTRACT

An adhesive based on casein, water-soluble extenders, natural or synthetic resin acids, resin alcohols or resin esters, and an alcohol is provided. The adhesive has specific amounts of these ingredients which leads to a viscosity of the adhesive which is temperature dependent to a surprisingly large extent. The adhesive is particularly useful in the labelling of bottles wherein the surface of the bottles is wet and cold.

17 Claims, No Drawings

WATER-CONTAINING ADHESIVE BASED ON CASEIN

BACKGROUND OF THE INVENTION

1. Field of the Invention

This invention relates to an adhesive based on casein, water-soluble extenders, fillers and optionally other additives and to its use in bottle labeling machines.

2. Discussion of Related Art

Casein adhesives are used as bottle labeling adhesives, primarily in fields where the surfaces to be labeled are wet and cold, i.e. for example in breweries, champagne houses and soft beverage factories. They have acquired a dominant position in these fields because they optimally satisfy the following requirements:

1. Good pumpability and flowability at the application temperature.

2. High wet tackiness for safe label removal.

3. Despite the high wet tackiness, the gripping fingers are able to remove the labels without damaging the constituent paper.

4. When the adhesive is applied to the cold wet surface, part of the water is absorbed by the adhesive, the rest being pushed away during the brushing-on step. Accordingly, the adhesive on the one hand is not overly diluted, on the other hand a continuous film of water is not left beneath the adhesive which, in both cases, would cause the labels to slip. Accordingly, a casein adhesive has an even balance between the absorption of water and the displacement of water. In this way, the casein adhesive immediately establishes firm contact between the label and the surface of the bottle, even a film of water is present on the surface.

5. The casein adhesive provides immediately for firm fixing of the label or foil to the cold wet surface despite the diluting effect of the adhering water. Accordingly, the label does not slip during further processing.

6. At the occasionally very high labeling rates encountered today (up to about 80,000 containers per hour), casein adhesives provide for clean, substantially splash-free processing with no stringing.

7. After drying, a firm bond is established, even to non-reflective glass.

8. Resistance to condensation is sufficient for most requirements.

9. Labels bonded with casein adhesives can readily be removed in good time in modern bottle washing machines using 1.5 to 2.5% sodium hydroxide solution.

Casein adhesives contain approximately 18 to 25% by weight of casein. Casein as a natural product varies to a certain extent in properties so that there is a need to replace casein at least partly with other adhesive substances which, in particular, have safely adjustable and reproducible properties and which are also more economical than casein.

EP B1-0 080 141 describes the production of a casein adhesive and its use for machine labeling. In Example 1, a water-containing adhesive is produced from casein, corn-starch, starch ether and a hydroxyalkyl ether of oxidatively degraded starch and typical additives, such as urea, borax, antifoam agents and preservatives. The adhesive obtained is considerably less temperature-dependent in its viscosity than casein adhesives containing at least 18% of casein.

The present invention seeks to provide a solution to this problem.

SUMMARY OF THE INVENTION

The solution provided by the invention is defined in the claims and resides essentially in the fact that the viscosity of an aqueous solution of casein and water-soluble extenders is temperature-dependent to a surprisingly large extent through the addition of natural or synthetic resin acids, resin alcohols or resin acid esters and also alcohol. A new adhesive has been developed on this basis and has the following composition:

a) 6 to 18% by weight of acid-precipitated casein, b) 1 to 10% by weight of one or more water-soluble extenders from the group consisting of starch, starch ethers, guar, guar ethers and homopolymers and copolymers of vinyl alcohol, acrylamides, acrylic acid and methacrylic acid, c) 1 to 50% by weight of natural or synthetic resin acids, resin acid esters or resin alcohols, d) 1 to 5% by weight of one or more alcohols containing 1 to 3 carbon atoms, e) basic compounds for adjusting the pH of the adhesive to a value of 6 to 10, f) 0 to 25% by weight of liquifying agents, g) 30 to 75% by weight of water, the percentages by weight being based on the adhesive as a whole.

DETAILED DESCRIPTION OF THE INVENTION

Accordingly, the adhesive according to the invention contains acid-precipitated casein as its basic constituent. Acid-precipitated casein is understood to be casein which has been precipitated by the addition of an acid, such as for example hydrochloric acid, sulfuric acid or lactic acid. The casein still contains a little water, namely 8 to 10 g of water per 100 g of casein. 100 g of adhesive preferably contains 6 to 10% by weight of casein.

"Resins" in the context of the invention are understood to be polymeric mixtures which are amorphous, do not have clearly defined softening points and may vary in their aggregate state from liquid to viscous to solid. Suitable resin acid esters and their saponification products are hydroabietyl alcohol, phthalic acid ester of hydroabietyl alcohol, gum rosin saponified with sodium hydroxide, rosin esters, such as for example methyl esters, di- or triethylene glycol esters, glycol esters of rosin (hydrogenated or non-hydrogenated), polyterpene resin. Saponified gum rosin is preferred.

Even very small additions of around 1% have significant effects. Although an addition of more than 50% by weight of resin derivatives is possible, such properties as condensation resistance, running behavior in the machine and wet tackiness, can be adversely affected. 100 g of adhesive preferably contain 5 to 30% by weight of resin acid esters, resin acids of resin alcohols.

The extenders are additives which are merely intended to reduce the cost of the adhesive rather than providing it with special properties. One or more members of the following groups may be used as the extenders: starches, starch ethers, guar, guar ethers, homopolymers and copolymers of vinyl alcohol, acrylamides, acrylic acid and methacrylic acid and salts thereof. More particularly, 1 to 10% of starches and 1 to 10% of starch ethers and also 1 to 10% of guar and 1 to 10% of guar ethers may be used as the extenders. Suitable synthetic water-soluble polymers are polyvinyl alcohol with a degree of saponification of around 70 to 98%, polyacrylamide, copolymers of acrylamide with methacrylamide, N-methyl acrylamide, N-ethyl acrylamide, N-propyl acrylamide, N-butyl acrylamide, dimethylaminoethyl methacrylate, acrylic acid, methacrylic acid, polyacrylic acid, copolymers of acrylic acid with acrylonitrile, acrylic acid, methyl and ethyl esters and alkali metal and ammonium salts thereof.

The alcohols used in accordance with the invention are mainly monohydric or polyhydric alcohols. Monohydric alcohols, particularly methanol, are preferred.

The flow properties of the adhesive may be controlled in known manner by the addition of certain water-soluble low molecular weight liquifying agents. Urea, thiourea and/or dicyanodiamide are particularly suitable liquefying agents, although inorganic and organic salts, such as halides, nitrates, sulfates, etc., may also be used. The liquifying agents are best used in a concentration of 0 to 25% by weight and preferably in a concentration of 1 to 15% by weight, based on the adhesive.

In addition, the adhesive contains basic compounds to adjust its pH to a value of 6 to 10. Borax is preferably used for this purpose.

In addition, other additives may be incorporated in the adhesive to modify its properties in a certain direction. These additives include wetting agents, foam inhibitors, preservatives, fillers and fragrances.

The total solids content of the adhesives according to the invention is in the range from 25 to 75% by weight and preferably in the range from 30 to 65% by weight, based on the final adhesive.

The adhesive according to the invention is prepared by mixing the starting components in a stirred mixer at temperatures of 20° to 30° C. To this end, the foam inhibitor, the water-soluble extender, the acid-precipitated casein and the basic compound are added with stirring to deionized water at room temperature and homogeneously dispersed therein. The mixture is heated to 50° to 95° C. and stirred for 10 to 30 minutes until a clear solution is obtained. The remaining water and also the resin derivatives and the alcohol are then added, followed by stirring until a homogeneous dispersion is obtained.

The final adhesive has a (Brookfield) viscosity typically in the range from 20,000 to 200,000 mPa.s and more particularly in the range from about 20,000 to 100,000 mPa.s at 25° C.

The adhesives according to the invention have the advantage that even wet bottles with a temperature of 2° to 30° C. can be labeled just as effectively with a small quantity of casein, for example 6% by weight, as with the known casein adhesive containing 18 to 25% by weight of casein. This has never been achieved by any other casein substitute adhesive.

The invention is illustrated by the following Examples.

EXAMPLES 1

4 g of 1,2-benzisothiazolin-3-one and 2 g of a commercial foam inhibitor were introduced with continuous stirring into 924 g of deionized water, after which 60 g of native cornstarch, 40 g of thermally degraded potato starch, 60 g of urea, 180 g of casein and 50 g of borax were added and homogeneously dispersed therein.

After heating to 85° C., the dispersion was stirred for 10 minutes. 600 g of "Hercolyn D" (a product of Hercules), 40 g of methanol and 40 g of water were introduced into the cooling solution.

The product thus obtained had a viscosity of 40,000 mPa.s at 25° C.

EXAMPLE 2

4 g of benzisothiazoline and 2 g of the commercial foam inhibitor were introduced with continuous stirring into 700 g of deionized water. 60 g of native cornstarch, 40 g of thermally/hydrolytically degraded potato starch, 60 g of urea, 160 g of casein and 40 g of borax were then added and homogeneously dispersed therein.

After heating to 85° C., the dispersion was stirred for 10 minutes. 800 g of "Abalyn" (a product of Hercules; chemical structure: methyl ester of gum rosin), 40 g of methanol and the remaining water were then introduced into the cooling solution so that it weighed 2,000 g.

The product thus obtained had a Brookfield viscosity of 35,000 mPa.s at 25° C.

EXAMPLE 3

Using the adhesives of Examples 1 and 2, labeling tests were carried out for 2 hours in a high-performance automatic labeling machine at a rate of up to 7,000 bottles per hour. The glue temperature after leaving the preceding heating station was 25° to 30° C. Particularly firm fixing was obtained on wet, cold (3° to 5° C.) bottles, corresponding to the adhesive effect obtained with an 18 to 25% casein glue.

EXAMPLE 4

On this occasion, the cold, wet bottles had a temperature of approximately 18° C. This Example otherwise corresponds to Example 3.

EXAMPLE 5

The adhesive according to the invention was compared in its viscosity behavior at the most important temperatures both with casein adhesives and with the known starch adhesive according to EP 0 080 141. 30° C. substantially corresponds to the preheating temperature. 15° C. substantially corresponds to the bottle temperature of non-alcoholic beverage bottles. 5° C. substantially corresponds to the temperature of beer bottles.

The adhesives were prepared as follows:

a) The starch adhesive I was prepared in accordance with the Optal 4075 formulation.

b) The starch adhesive II was prepared in accordance with Example 1 of EP 0 080 141.

c) The casein adhesive IV was prepared in accordance with the Optal K 560 formulation.

d) The adhesive V according to the invention was prepared in accordance with Example 2, page 7.

The viscosities of all the adhesives were measured as follows: Brookfield, spindle 7, 20 r.p.m., 25° C.

The results obtained are set out in the following Table:

TABLE

| Temp. | I Starch adhesive 30% FC[1] | II Starch adhesive 50% FC | III Casein adhesive 18% casein | IV Casein adhesive 21% casein | V Adhesive acc. to the invention 8% casein |
|---|---|---|---|---|---|
| 30° C. | 42,000 | 25,000 | 35,000 | 42,000 | |
| 25° C. | 50,000 | 32,000 | 55,000 | 65,000 | 35,000 |
| 20° C. | 65,000 | 40,000 | 82,000 | 100,000 | 63,000 |
| 15° C. | 82,000 | 55,000 | 115,000 | 180,000 | 103,000 |
| 10° C. | 98,000 | 75,000 | 200,000 | 310,000 | 190,000 |
| 5° C. | 125,000 | 102,000 | Cannot be measured | Cannot be measured | Cannot be measured |

[1]FC = reflectometer value

Comparison of the results set out in the above Table shows that the viscosities of the adhesive according to the invention change just as much at temperatures of 0° to 15° C. as those of the casein adhesive containing 18% of casein. The effect of this considerable increase in viscosity is that the labels remain firmly in place at 3° to 15° C. The increase in viscosity of the starch adhesives at temperatures in this range is far smaller.

We claim:

1. An adhesive composition comprising:
   a) 6 to 18% by weight of acid-precipitated casein,
   b) 1 to 10% by weight of a water-soluble extender selected from the group consisting of starch, starch ethers, guar, guar ethers, and homopolymers or copolymers of vinyl alcohol, acrylamides, acrylic acid and methacrylic acid,
   c) 1 to 50% by weight of a resin selected from the group consisting of natural or synthetic resin acids, resin acid esters and resin alcohols,
   d) 1 to 5% by weight of an alcohol containing 1 to 3 carbon atoms,
   e) a basic compound in an amount effective to adjust the pH of the composition to a value of 6 to 10,
   f) 0 to 25% by weight of a liquifying agent and
   g) 35 to 75% by weight of water,
   the percentages by weight being based on the composition as a whole.

2. A composition as claimed in claim 1 having a casein content of 6 to 10% by weight.

3. A composition as claimed in claim 1 wherein said resin is selected from the group consisting of hydroabietyl alcohol, phthalic acid ester of hydroabietyl alcohol, gum rosin saponified with sodium hydroxide, rosin methyl esters, rosin di- or triethylene glycol esters, rosin glycol esters, and polyterpene resin.

4. A composition as claimed in claim 1 wherein said resin is a saponified gum rosin.

5. A composition as claimed in claim 1 having a content of 5 to 30% by weight of said resin.

6. A composition as claimed in claim 1 wherein said alcohol having 1 to 3 carbon atoms is methanol.

7. A composition as claimed in claim 1 having a content of liquefying agent of 1 to 15% by weight.

8. A composition as claimed in claim 7 wherein said liquifying agent is selected from the group consisting of urea, thiourea and dicyanodiamide.

9. A composition as claimed in claim 1 wherein said basic compound is borax.

10. A composition as claimed in claim 1 having a total solids content of 25 to 75% by weight.

11. A composition as claimed in claim 1 having a total solids content of 30 to 65% by weight.

12. A composition as claimed in claim 1 comprising:
   a) 6 to 10% by weight of acid-precipitated casein,
   b) 1 to 10% by weight of a water-soluble extender selected from the group consisting of starch, starch ethers, guar, guar ethers, and homopolymers or copolymers of vinyl alcohol, acrylamides, acrylic acid and methacrylic acid,
   c) 5 to 30% by weight of a natural or synthetic resin acid, a resin acid ester or a resin alcohol,
   d) 1 to 5% by weight of an alcohol containing 1 to 3 carbon atoms,
   e) a basic compound in an amount effective to adjust the pH of the composition to a value of 6 to 10,
   f) 1 to 15% by weight of a liquifying agent and
   g) 35 to 75% by weight of water,
   the percentages by weight being based on the composition as a whole.

13. A composition useful as an adhesive comprising:
   a) 6 to 10% by weight of acid-precipitated casein,
   b) 1 to 10% by weight of a water-soluble extender selected from the group consisting of starch, starch ethers, guar, guar ethers, and homopolymers or copolymers of vinyl alcohol, acrylamides, acrylic acid and methacrylic acid,
   c) 5 to 30% by weight of a resin selected from the group consisting of saponified gum rosins,
   d) 1 to 5% by weight of methanol,
   e) borax in an amount effective to adjust the pH of the composition to a value of 6 to 10,
   f) 1 to 15% by weight of a liquifying agent selected from the group consisting of urea, thiourea and dicyanodiamide, and
   g) 35 to 75% by weight of water,
   the percentages by weight being based on the composition as a whole.

14. In a method of labeling glassware, the improvement comprising applying the composition of claim 1 to the surface of glassware to be labelled.

15. A method as claimed in claim 14 wherein said glassware is a bottle having a wet surface to be labelled.

16. A method as claimed in claim 14 wherein said composition comprises:
   a) 6 to 10% by weight of acid-precipitated casein,
   b) 1 to 10% by weight of a water-soluble extender selected from the group consisting of starch, starch ethers, guar, guar ethers, and homopolymers or copolymers of vinyl alcohol, acrylamides, acrylic acid and methacrylic acid, c) 5 to 30% by weight of a natural or synthetic resin acid, a resin acid ester or a resin alcohol, d) 1 to 5% by weight of an alcohol containing 1 to 3 carbon atoms, e) a basic compound in an amount effective to adjust the pH of the composition to a value of 6 to 10, f) 1 to 15% by weight of a liquifying agent and g) 35 to 75% by weight of water, the percentages by weight being based on the composition as a whole.

17. A method as claimed in claim 14 wherein said composition comprises:

a) 6 to 10% by weight of acid-precipitated casein, b) 1 to 10% by weight of a water-soluble extender selected from the group consisting of starch, starch ethers, guar, guar ethers, and homopolymers or copolymers of vinyl alcohol, acrylamides, acrylic acid and methacrylic acid, c) 5 to 30% by weight of a resin selected from the group consisting of saponified gum rosins, d) 1 to 5% by weight of methanol, e) borax in an amount effective to adjust the pH of the composition to a value of 6 to 10, f) 1 to 15% by weight of a liquifying agent selected from the group consisting of urea, thiourea and dicyanodiamide, and g) 35 to 75% by weight of water, the percentages by weight being based on the composition as a whole.

* * * * *